United States Patent [19]
Ruiz et al.

[11] Patent Number: 5,771,135
[45] Date of Patent: Jun. 23, 1998

[54] VIBRATION DAMPING SYSTEM FOR HEAD SUSPENSION ASSEMBLIES

[75] Inventors: Oscar J. Ruiz; A. David Erpelding, both of San Jose; Thomas F. Roth, Morgan Hill, all of Calif.

[73] Assignee: International Business Machines Corporation, Armonk, N.Y.

[21] Appl. No.: 595,518

[22] Filed: Feb. 1, 1996

Related U.S. Application Data

[63] Continuation of Ser. No. 259,055, Jun. 13, 1994, abandoned.

[51] Int. Cl.$^6$ .............................. G11B 5/48; G11B 21/16; G11B 5/60
[52] U.S. Cl. ........................................... 360/104; 360/103
[58] Field of Search ................................... 360/104, 103, 360/105, 106

[56] References Cited

U.S. PATENT DOCUMENTS

| | | | |
|---|---|---|---|
| 4,219,853 | 8/1980 | Albert et al. ............................ | 360/103 |
| 4,543,295 | 9/1985 | St. Clair et al. . | |
| 4,734,805 | 3/1988 | Yamada et al. .......................... | 360/104 |
| 4,760,478 | 7/1988 | Pal et al. . | |
| 4,819,094 | 4/1989 | Oberg ...................................... | 360/104 |
| 4,839,232 | 6/1989 | Morita et al. . | |
| 4,990,309 | 2/1991 | Miyafuji et al. ......................... | 420/471 |
| 4,991,045 | 2/1991 | Oberg . | |
| 4,996,623 | 2/1991 | Erpelding et al. . | |
| 5,012,369 | 4/1991 | Owe et al. ............................... | 360/104 |
| 5,145,553 | 9/1992 | Albrechta et al. . | |
| 5,187,625 | 2/1993 | Blaeser et al. .......................... | 360/105 |
| 5,298,331 | 3/1994 | Kanakarajan et al. . | |

FOREIGN PATENT DOCUMENTS

| | | |
|---|---|---|
| 1-248372 | 3/1989 | Japan . |
| 2-218078 | 8/1990 | Japan . |
| 3-91173 | 4/1991 | Japan . |
| 3-278382 | 12/1991 | Japan . |
| 2193833 | 2/1988 | United Kingdom . |
| WO 92/13345 | 8/1992 | WIPO . |

OTHER PUBLICATIONS

E.M. Kerwin, "Damping of Flexural Wave by a Constrained Viscoelastic Layer," The Journal of the Acoustical Society of American, vol. 31, pp. 952–962 (1959). No month.
Cooper et al., "Constrained Layer Damper Spring Assemblies," IBM Technical Disclosure Bulletin, vol. 33, No. 8, pp. 373–374 (Jan. 1991).
C.E. Yeack–Scarnton, "PVF$_2$ Resonance Damping For Magnetic Recording," IBM Technical Disclosure Bulletin, vol. 28, No. 12, pp. 5611–5613 (May 1986).
J.H. Nayak, "Auxiliary Mass Damping of Disk–File Sliders," IBM Technical Disclosure Bulletin, vol. 26, No. 6, pp. 2922–2923 (Nov. 1983).
R. Plunkett and C.T. Lee, "Length Optimization for Constrained Viscoelastic Layer Damping," The Journal of the Acoustical Society of American, vol. 48, pp. 150–161 (1970). No month.
F. Maseeh and S. Senturia, "Viscoelasticity and Creep Recovery of Polyimide Thin Films," VLSI Memo 90–600, MIT (Jun. 1990).
D. Henze et al., "Effects of Constrained Layer Damping on the Dynamics of a Type 4 In–Line Head Suspension," IEEE Trans. Mag., vol. 26, No. 5, pp. 2439–2441 (Sep. 1990).

*Primary Examiner*—Stuart S. Levy
*Assistant Examiner*—A. Giordano
*Attorney, Agent, or Firm*—Hopkins & Carley; Donald J. Pagel

[57] ABSTRACT

A system for damping vibrations in the head arm suspension assembly of a magnetic recording disk file comprised of a first and a second laminated suspension member each bonded to a ceramic actuator arm. The arm includes a movable arm tongue which is surrounded on three sides by a channel and includes a first and second cavity. The first suspension member includes a first suspension tongue and the second suspension member includes a second suspension tongue. A first damping element is positioned in the first cavity between the arm tongue and the first suspension tongue. A second damping element is positioned in the second cavity between the arm tongue and the second suspension tongue.

34 Claims, 8 Drawing Sheets

VIBRATION DAMPING SYSTEM FOR HEAD SUSPENSION ASSEMBLIES

This application is a continuation of application Ser. No. 8/259,055 filed Jun. 13, 1994, now abandoned.

TECHNICAL FIELD

The present invention relates to a system for damping vibrations in the arm and slider suspension assembly of an information storage device and more particularly to a system in which a layer of damping material is positioned between the arm and a laminated slider suspension assembly in a magnetic disk file.

BACKGROUND ART

Magnetic recording disk files that utilize a transducer mounted on a slider for reading and/or writing data on at least one rotatable disk are well-known in the art. In such systems, the slider is typically attached to an actuator arm by a suspension system.

The use of laminated materials for constructing slider suspension systems in magnetic disk files is also known in the art. For example, Erpelding et al., in U.S. Pat. No. 4,996,623, issued Feb. 26, 1991, disclose a suspension system comprised of a sheet of polyimide material sandwiched between two metal layers.

It is known that vibration of the arm and suspension in disk drives produces undesirable effects such as nonrepeatable runout of the recording element on the slider. One known approach to reducing such vibration is to incorporate a viscoelastic material into the suspension system that supports the slider. For example, Pal et al., in U.S. Pat. No. 4,760,478, issued Jul. 26, 1988, disclose a magnetic head support arm having a layer of viscoelastic material fixed to the load bearing member for damping vibrations in the support arm.

Another approach has been to position a layer of viscoelastic damping material on the suspension. For example, M. Gotou, in Japanese Patent Document No. 03-278382, published on Dec. 10, 1991, discloses an arm in which a layer of viscoelastic damping material is positioned on the suspension underneath a constraint plate. Similarly, C. E. Yeack-Scranton, in "PVF$_2$" Resonance Damping For Magnetic Recording," IBM Technical Disclosure Bulletin, Vol. 28, No. 12, pages 5611–5613 (May 1986), discloses an apparatus in which a sheet of damping material is attached to a surface of the suspension.

Still another approach has been to fill an aperture in the suspension with an elastic material. For example, S. Takekado, in Japanese Patent Document No. 01-248372, published on Mar. 10, 1989, discloses a suspension in which an "S" shaped or "H" shaped channel on the surface of the suspension is filled with an elastic material to provide damping.

In analyzing the problem of unwanted vibrations in generalized systems, theoretical models have been developed for using a constrained layer and a constraining layer to damp the vibrations. These models indicate that the effectiveness of the overall damping obtained depends on the stiffness of the constrained layer as well as on its length. The appropriate length can be estimated in several ways, and both analytical and experimental methods have been used. For example, in a paper entitled "Damping of Flexural Waves by a Constrained Viscoelastic Layer," The Journal of the Acoustical Society of America, vol. 31 (1959), by E. M. Kerwin, the effective length of the constrained layer is related to the wavelength of bending waves.

In another paper, entitled "The Effect of Cuts in Damping Tapes," Int. Congress on Acoustics, 4th, Copenhagen (August 1962), by G. G. Parfitt, different constraining layer lengths cut at regular intervals are examined. In another paper entitled "Macromechanism of Damping in Composite Structures," ASTM (1965), by E. M. Kerwin, the effect of constraining layers and free viscoelastic layers is studied. In "Length Optimization for Constrained Viscoelastic Layer Damping," The Journal of the Acoustical Society of America, vol. 48 (1970), by R. Plunkett and C. T. Lee, an effective constraining layer length is determined for single and multiple damping layers. In another paper entitled "Viscoelasticity and Creep Recovery of Polyimide Thin Films," VLSI Memo 90-600, MIT (June 1990) by F. Maseeh and S. Senturia, the viscoelastic properties of thin polyimide films are characterized and measured.

SUMMARY OF THE PRESENT INVENTION

Briefly, the preferred embodiment of the present invention comprises a flat rectangular shaped ceramic arm for attachment to an actuator in a magnetic disk file. The arm has a top surface and a bottom surface with a thickness "t" separating the top surface from the bottom surface.

The arm includes an arm tongue which is a region of the arm that is separated from the arm on three sides by a channel which extends completely through the thickness "t" of the arm. The arm tongue includes a first cavity which is comprised of a region of the arm tongue that is recessed from the first surface of the arm by a depth "D." The arm tongue also includes a second cavity which is comprised of a region of the arm tongue that is recessed from the second surface of the arm by a depth "E."

A first suspension is attached to the arm for holding a first data transducer such as a magnetic read/write head. The first suspension is comprised of a three layer piece of laminated material and has a total thickness "p." The bottom (or first) layer of the first suspension comprises a rigid material like stainless steel. The second layer comprises a viscoelastic dielectric material like a polyimide. The top (or third) layer comprises an electrically conductive material such as high strength copper alloy.

The first suspension includes a first suspension tongue which is a region of the first suspension that is separated from the rest of the first suspension on three sides by a channel which extends completely through the bottom layer and the top layer of the laminated material. The second layer is left intact inside the channel. The first suspension is bonded to the arm along the bottom layer of the laminate with the first suspension tongue being positioned over the arm tongue and the first cavity. A first damping element is positioned in the first cavity between the first arm tongue and the first suspension tongue for damping vibrations transmitted between the arm and the first suspension.

A second suspension, also comprised of a three layer laminated material, and having a second suspension tongue, is bonded to the second surface of the arm with the second suspension tongue being positioned over the second cavity. A second damping element is positioned in the second cavity between the arm tongue and the second suspension tongue for damping vibrations transmitted between the arm and the second suspension.

In alternative embodiments of the present invention, the single arm tongue is replaced by two rectangular arm tongues and the first and second suspension tongues are eliminated.

DETAILED DESCRIPTION OF THE PREFERRED EMBODIMENT

Figure 1:
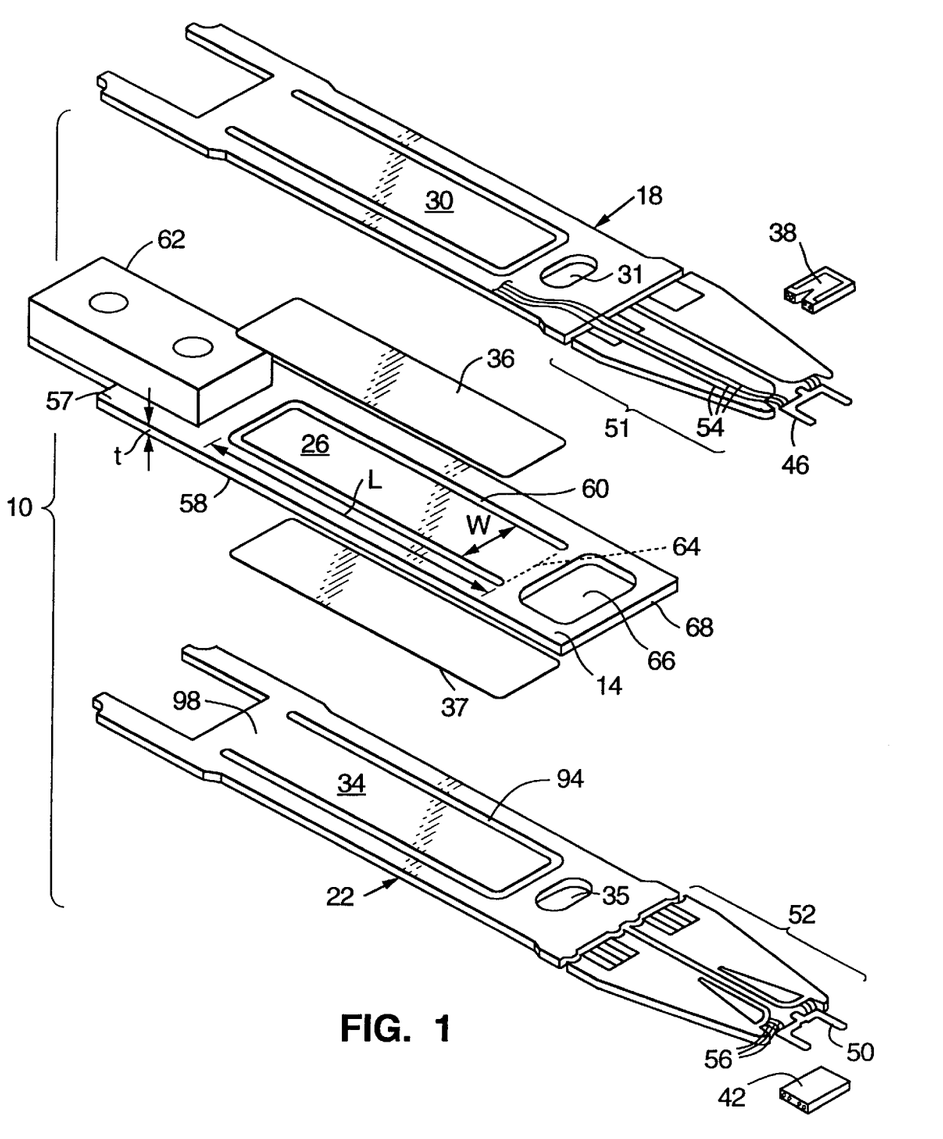
FIG. 1 is an exploded view of a damping system according to the present invention.

FIG. 1 is an exploded view of an arm suspension damping system 10. The system 10 comprises an arm 14, a first head suspension 18 and a second head suspension 22. An arm tongue 26 is formed in the arm 14. The first suspension 18 includes a first opposing tongue 30 and an aperture 31. The second suspension 22 includes a second opposing tongue 34 and an aperture 35. A first damping element 36 is positioned between the arm tongue 26 and the first opposing tongue 30, and a second damping element 37 is positioned between the arm tongue 26 and the second opposing tongue 34.

In the preferred embodiment, the damping elements 36 and 37 comprise films of a viscoelastic material such as viscoelastic polymer #110 or #112 manufactured by 3M Corporation (polyacrylate polymers) having a thickness of 0.002 inches. Viscoelastic means that the stress in a deformed material is proportional to both the deformation and the rate of deformation. Viscoelastic materials also exhibit creep and relaxation behavior.

A first read/write head slider 38 is mounted at an end of the first head suspension 18 and a second read/write head slider 42 is mounted at an end of the second head suspension 22. The read/write sliders 38 and 42 each include a transducer for reading and writing data on a medium such as a hard magnetic disk.

A first slider mount 46 and a second slider mount 50 provide locations for attaching the sliders 38 and 42, to the first and second head suspensions 18 and 22, respectively. The suspension 18 includes a link portion 51 and the suspension 22 includes a link portion 52.

A plurality of electrical lines 54 on a surface of the first head suspension 18 function as electrical connections for connecting the slider 38 to an external system as is explained later with respect to FIG. 8.

The second read/write head slider 42 includes a plurality of electrical lines 56 that function as electrical connections that connect the slider 42 to an external system.

In the preferred embodiment, the arm 14 is comprised of a ceramic material such as alumina ($Al_2O_3$) and is rectangular in shape with a thickness "t" separating a top surface 57 from a bottom surface 58. The arm tongue 26 comprises a rectangular region formed in the arm 14 having a length "L," a width "W" and a depth "D" (shown in FIG. 4). A channel 60 extends around the perimeter of the tongue 26 on three sides. The channel 60 comprises a region in which the material comprising the arm 14 has been removed thereby leaving an empty space that extends all of the way through the thickness "t" of the arm 14. The channel 60 allows the tongue 26 to move up, down and sideways relative to the surfaces 57 and 58. Typically, the channel 60 is formed by laser machining.

Figure 8:
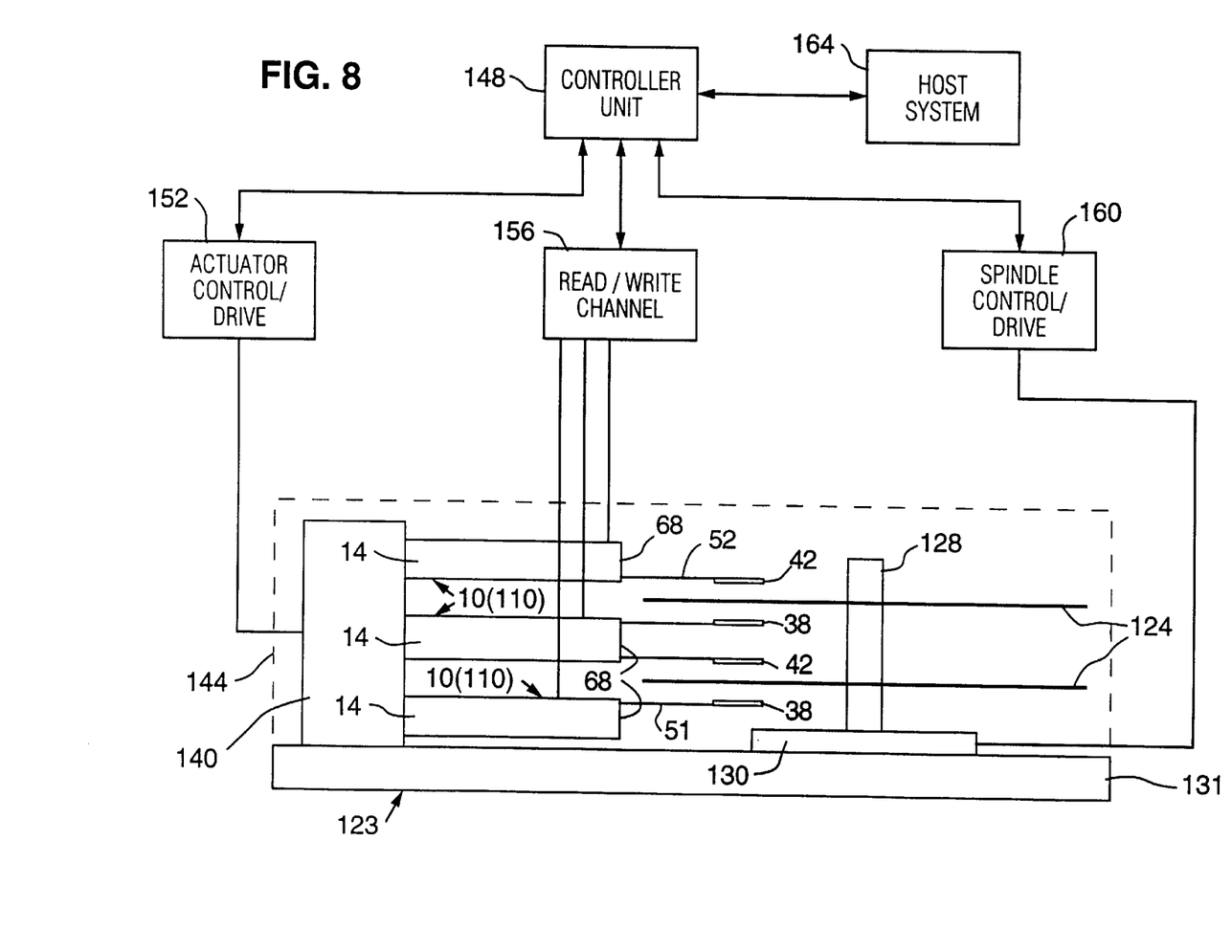
FIG. 8 is a schematic diagram of a disk file utilizing the damping system according to the present invention.

The arm 14 includes an attachment member 62 for attachment to an actuator 140 (shown in FIG. 8). The tongue 26 includes a base 64 which is positioned at the end of the tongue 26 farthest from the attachment member 62 and connects the tongue 26 to the arm 14. An aperture 66 is positioned near a distal end 68 of the arm 14 and provides mass reduction and clearance for assembly tooling. When the system 10 is assembled, the first head suspension 18 and the second head suspension 22 are bonded to the arm 14 with the link portions 51 and 52 extending beyond the distal end 68 (see FIG. 8). In some applications, the system 10 may include only one of the suspensions 18 or 22 (see FIG. 8).

Figure 2:
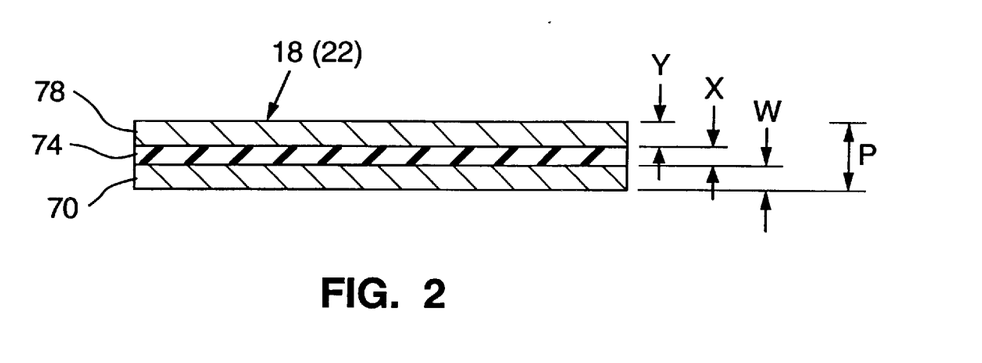
FIG. 2 is a schematic cross-sectional view of a portion of the first or second head suspensions.

FIG. 2 illustrates that the first head suspension 18 and the second head suspension 22 are each comprised of a laminated material having a first layer 70, a second layer 74 and a third layer 78. The first layer 70 is positioned adjacent to one surface of the second layer 74. The third layer 78 is positioned adjacent to a different surface of the second layer 74 so that the second layer 74 separates the first layer 70 and the third layer 78, with the layers 70, 74 and 78 all lying in planes that are parallel to each other.

The first layer 70 has a thickness "w" of approximately 0.051 millimeters and comprises a rigid material such as stainless steel. The second layer 74 has a thickness "x" of approximately 0.006 millimeters and comprises a viscoelastic dielectric material such as a polyimide. The third layer 78 has a thickness "y" of approximately 0.0127 millimeters and comprises an electrically conducting material such as a high strength beryllium copper alloy. The first and second head suspensions 18 and 22 each have a total thickness "p" equal to the sum of "w," "x" and "y."

Figure 3:
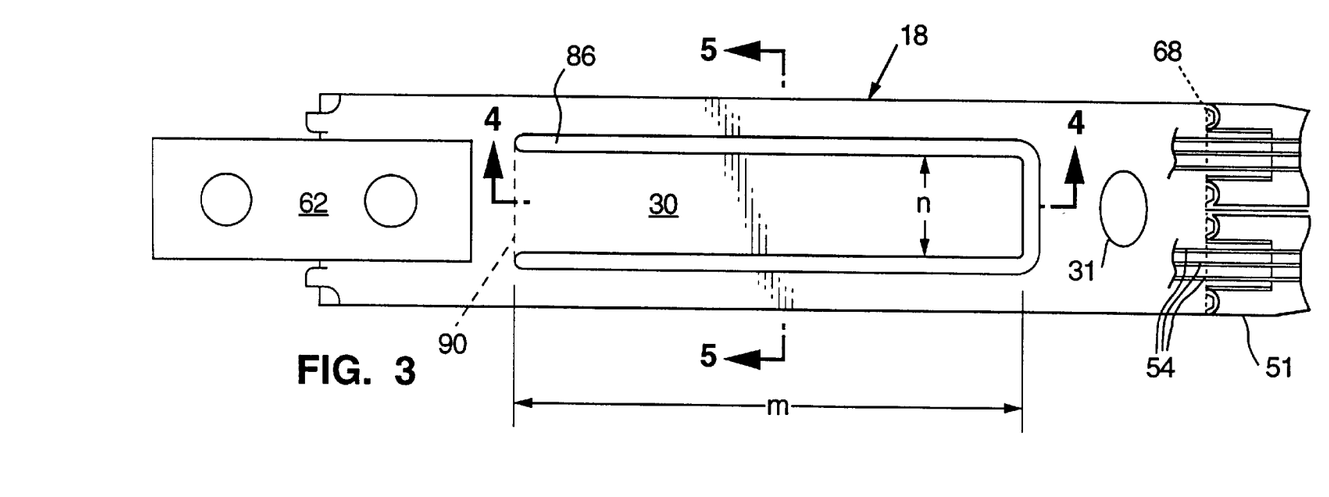
FIG. 3 is a top view of the damping system according to the present invention.

FIG. 3 illustrates that the opposing tongue 30 is rectangular in shape and has a length "m" and a width "n." A channel 86 extends around the perimeter of the tongue 30 on three sides where the third layer 78 and the first layer 70 have been etched away to form the tongue 30. A base 90 of the tongue 30 is positioned at the end of the tongue 30 closest to the attachment member 62 and comprises the end of the tongue 30 that has not been etched away to form the channel 86. The second opposing tongue 34 is formed in the same manner as the first opposing tongue 30 and also includes a channel 94 and a base 98 (illustrated in FIG. 1). FIG. 3 also illustrates that the link portion 51 extends beyond the distal end 68 of the underlying arm 14.

Figure 4:
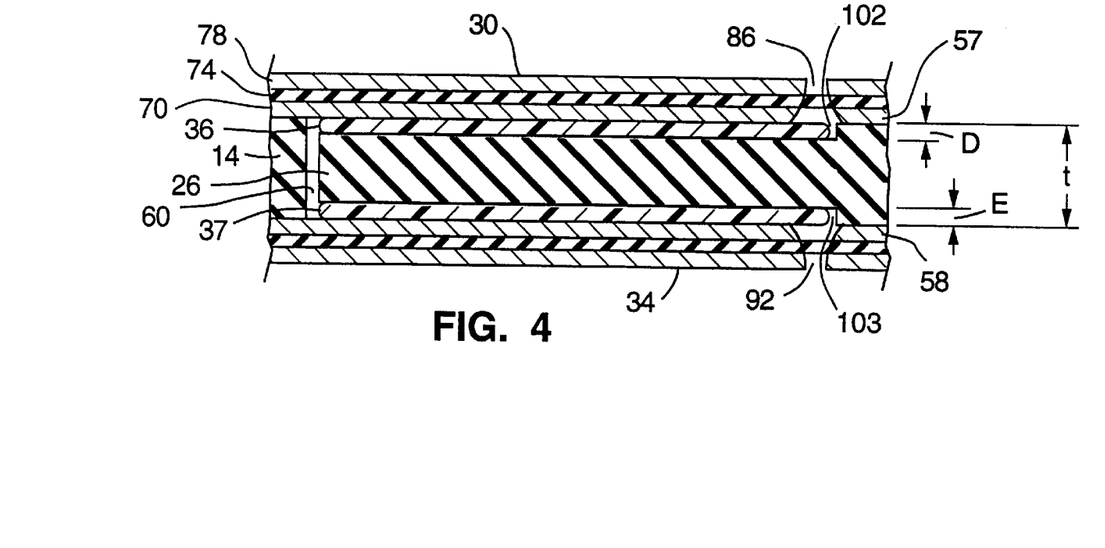
FIG. 4 is a cross-sectional view of the damping system taken along the line 4—4 of FIG. 3.

FIG. 4 illustrates that the tongue 30 lies over the arm tongue 26 and that the first damping element 36 is positioned in a cavity 102 formed by recessing the tongue 26 by a depth "D" relative to the surface 57. Similarly, the tongue 34 is positioned underneath the arm tongue 26 and the second damping element 37 is positioned in a cavity 103 formed by recessing the tongue 26 by a depth "E" relative to the surface 58. The arm tongue 26 is formed as a consequence of forming the channel 60 by laser machining. The cavities 102 and 103 are formed by a milling process using diamond tipped tools, standard in the ceramic machining industry.

Representative values (in millimeters) for the parameters illustrated in FIGS. 1–4 are as follows: L=16.25 mm; W=3.5 mm; m=16.5 mm; and D=E=0.051 mm.

It should be appreciated that the values listed above are dependent on the particular configuration and materials being used. For different systems, different values for the parameters will need to be determined.

Figure 5:
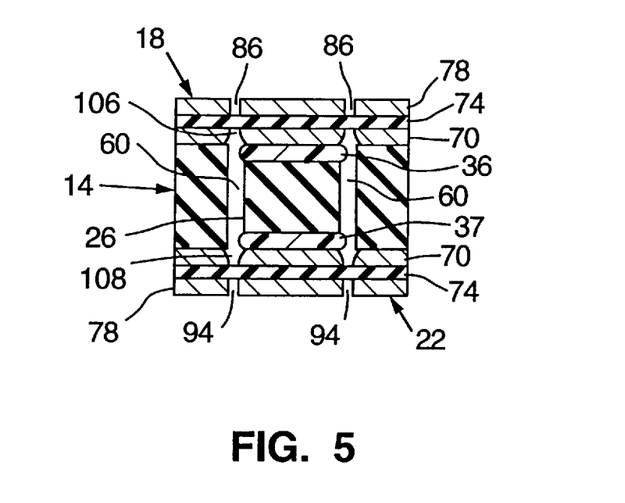
FIG. 5 is a cross-sectional view of the damping system taken along the line 5—5 of FIG. 3.

FIG. 5 illustrates that the channel 86 extends down to the second layer 74. The second layer 74 remains intact but a channel 106 is etched in the first layer 70, directly underneath the channel 86. Similarly, a channel 108 is etched in the first layer 70 directly above the channel 94 in the second opposing tongue 34, with the second layer 74 remaining intact. The intact second layer 74 forms a barrier that encloses the damping element 36 in the cavity 102, thereby protecting the disk file 123 and all of the components of the system 10 from outgassing and/or contamination that might be attributable to the damping element 36. Similarly, the damping element 37 is enclosed in the cavity 103.

Conversely, isolating (encapsulating) the damping elements 36 and 37 in the cavities 102 and 103 protects the damping elements 36 and 37 from any humidity and/or contamination from additional processing of the system 10.

Isolating (encapsulating) the damping elements 36 and 37 in the cavities 102 and 103 allows the damping elements 36 and 37 to be comprised of materials that may not otherwise be suitable for use in a head-disk enclosure, for example because of the chemical reactivity of the new materials with the head-disk environment. Some of the other damping films in this category include: Scotch Y-9460 (generic chemical name—polyacrylate, manufactured by 3M Corporation), Scotch 465 (generic chemical name—polyacrylate, manufactured by 3M Corporation), Soundcoat Type-N (manufactured by The Soundcoat Company, Inc.), Soundcoat Type-P (manufactured by The Soundcoat Company, Inc.), Mactac 2012 (generic chemical name—polyacrylate, manufactured by Hactac) and Norwood TM525 (manufactured by Norwood).

The electrical lines 54, and the channels 86 and 106, are formed by etching the suspension 18 using standard metal etching techniques. For example, when the third layer 78 comprises beryllium copper, the layer 78 is etched with ferric chloride. The etching process removes metal from specified regions, thereby forming the channel 86. The electrical lines 54 represent conductive regions that have not been etched, but which have had adjacent metal removed by the etching process thereby forming the electrical lines 54. The channels 94 and 108, and the electrical lines 56 are formed in the same manner as the electrical lines 54 and the channels 86 and 106.

Figure 6:
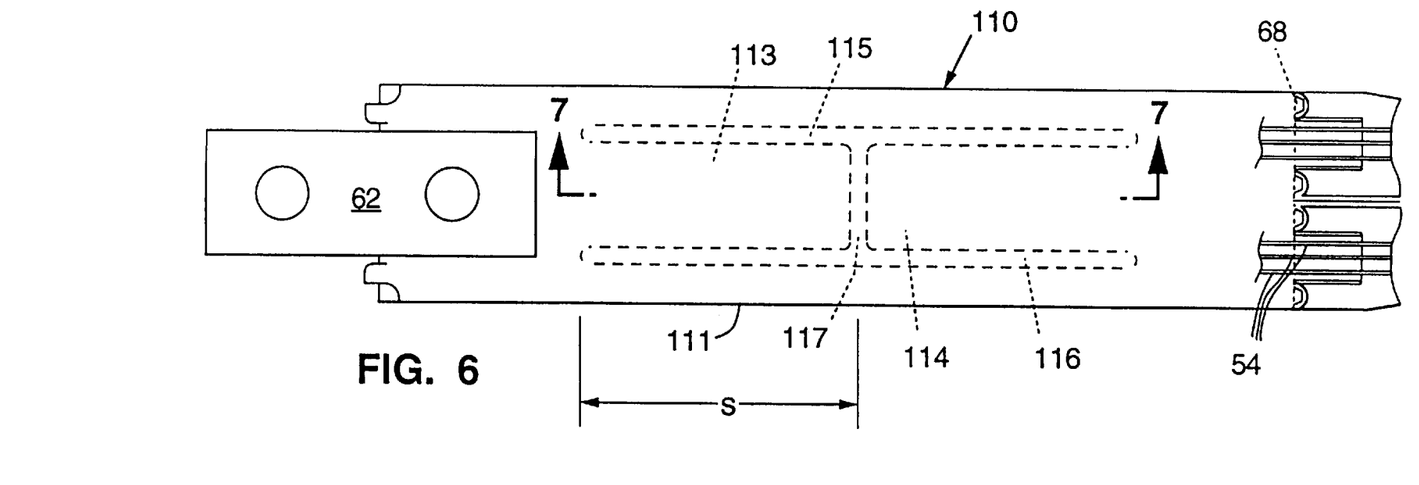
FIG. 6 is a top view of an alternative embodiment of the damping system.

FIG. 6 illustrates an arm suspension damping system 110 which is an alternative embodiment of the damping system 10. Elements of the system 110 that are identical to corresponding elements in the system 10 are indicated by the same reference numerals.

The system 110 includes a first suspension 111 similar to the suspension 18 except that there is no first opposing tongue 30. An arm 112 (shown in FIG. 7) includes a pair of rectangular tongues 113 and 114. The dashed lines in FIG. 6 illustrate how the tongues 113 and 114 are positioned underneath the first suspension 111. Each of the tongues 113 and 114 have an identical length "s" which is generally shorter than the length "L" of the tongue 26 (typically "s" is approximately half of "L"). A channel 115 borders the tongues 113 and 114 on one side. A channel 116 borders the tongues 113 and 114 on the opposite side and runs parallel to the channel 115. A channel 117 separates the tongues 113 and 114 and runs perpendicular to the channels 115 and 116.

Figure 7:
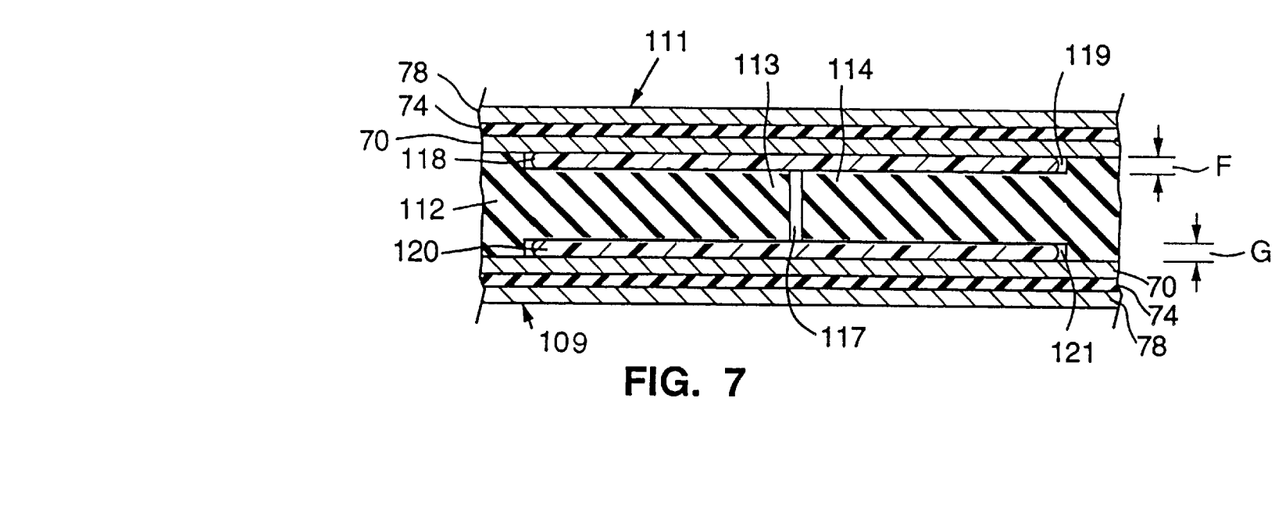
FIG. 7 is a cross-sectional view of the damping system taken along the line 7—7 of FIG. 6.

FIG. 7 is a cross-sectional view of the system 110 illustrating that the first suspension 111 and a second suspension 109 are each comprised of the three layers 70, 74 and 78 in the same manner as the suspensions 18 and 22, and are positioned on opposite sides of the arm 112. A first damping element 118 is positioned in a cavity 119 formed by recessing the tongues 113 and 114 to the depth "F." A second damping element 120 is positioned in a cavity 121 formed by recessing the tongues 113 and 114 to the depth "G" equal to the depth "F." Of course, the tongues 113 and 114 can be replaced with a single tongue, such as the tongue 26 shown in FIG. 1, or with differently shaped tongues. Because the channels 115, 116 and 117 extend completely through the arm 112, the tongues 113 and 114 can move up, down and sideways relative to the arm 112.

FIG. 8 is a schematic diagram of a magnetic recording disk file 123 that utilizes the suspension damping system 10 of the present invention. It should be understood that the damping system 110 could be substituted for the system 10 in the following description. It should also be understood that the system 10 could also be used with other data storage systems that require a vibration minimizing arm damping system, such as floppy disk drives, optical drives or compact disk players.

The disk file 123 comprises a plurality of magnetic recording disks 124 suitable for use in hard disk drives. The disks 124 are mounted on a spindle shaft 128 which is connected to a spindle motor 130. Motor 130 is mounted to a chassis 131.

The read/write sliders 38 and 42 are positioned over the disks 124 such that each side of a disk 124 can be accessed by one of the sliders 38 or 42. Each of the sliders 38 and 42 include a transducer for reading and writing data on a plurality of concentric data tracks on the disks 124. Each of the damping systems 10 are attached to an actuator 140 by the actuator arm 14. The actuator 140 moves the actuator arm 14 (and hence the damping system 10 and the sliders 38 and 42) in a radial direction or arcing direction across the disk 124. An enclosure 144 (shown by a dashed line in FIG. 5) seals the disk file 123 and provides protection from particulate contamination.

A controller unit 148 provides overall control to the system 123. The controller unit 148 contains a central processing unit (CPU), memory unit and other digital circuitry and is connected to an actuator control/drive unit 152 which in turn is electrically connected to the actuator 140. This allows the controller 148 to control the movement of the sliders 38 and 42 over the disks 124. The controller 148 is electrically connected to a read/write channel 156 which in turn is electrically connected to the sliders 38 and 42, in part by the electrical lines 54 and 56 shown in FIG. 1. This allows the controller 148 to send and receive data from the disks 124. the controller 148 is electrically connected to a spindle control/drive unit 160 which in turn is electrically connected to the spindle motor 130. This allows the controller 148 to control the rotation of the disks 124. A host system 164, which is typically a computer system, is electrically connected to the controller unit 148. The host system 164 may send digital data to the controller 148 to be stored on the disks 124, or may request that digital data be read from the disks 124 and sent to the system 164. The basic operation and structure of data storage systems, such as the disk file 123 (without the damping systems 10 or 110), is well-known in the art and is described in more detail in

*Magnetic Recording Handbook*, C. Dennis Mee and Eric D. Daniel, HcGraw - Hill Book Company (1990).

To evaluate the effectiveness of the damping systems 10 and 110, the vibrations in three systems are measured. The three systems are the damping system 10, the damping system 110 and a an "undamped" system. The undamped system is comprised of the arm 14 and the suspensions 18 and 22, but the tongues 26, 30 and 34, and the damping elements 36 and 37, are absent. Typically, in taking measurements the link portions 51 and 52 are clipped off from the suspensions 18 and 22 to facilitate data taking at the distal end 68 of the arm 14.

Figure 9:
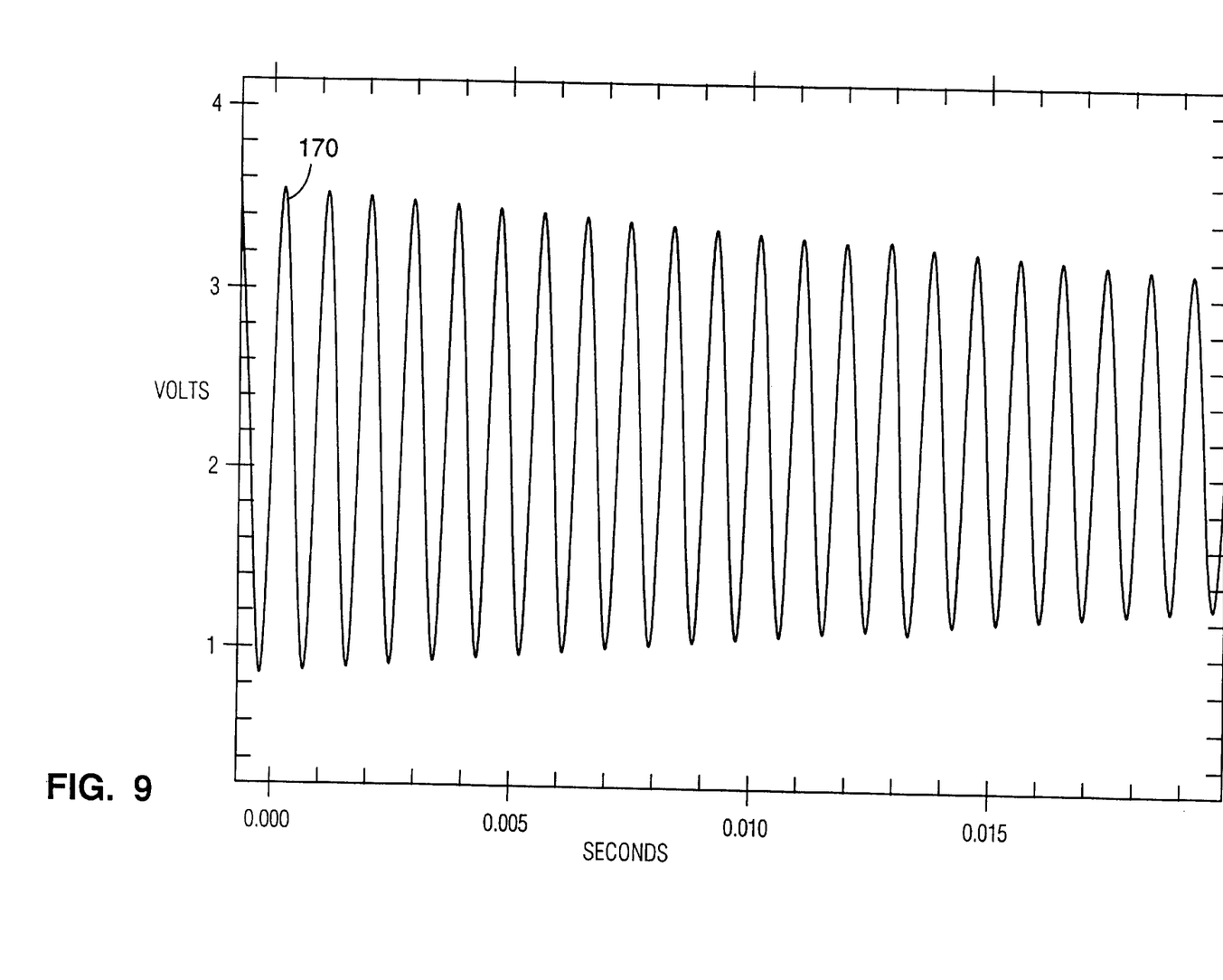
FIG. 9 is a graphical representation of the motion observed for an undamped arm/suspension assembly.

FIG. 9 shows a voltage signal 170 that illustrates the out of plane motion that is observed at the distal end 68 of the arm 14 during free vibration. The frequency of the observed cyclic motion corresponds to the first bending mode of the arm 14. The signal 170 is generated by recording the output from a fiber optic displacement transducer (photonic probe) and plotting the output against time. The critical damping ratio ($C/C_{cr}$) is defined as follows:

$$C/C_{cr} = \delta/\sqrt{(2\pi)^2 + \delta^2}$$

where $\delta = 1/n \cdot \ln x_o/x_n$ and $x_o$ and $x_n$ are vibrational amplitudes n cycles apart. The calculated critical damping ratio ($C/C_{cr}$) for the undamped arm shown in FIG. 9 is approximately 0.003 and the frequency is 1075 Hz.

Figure 10:
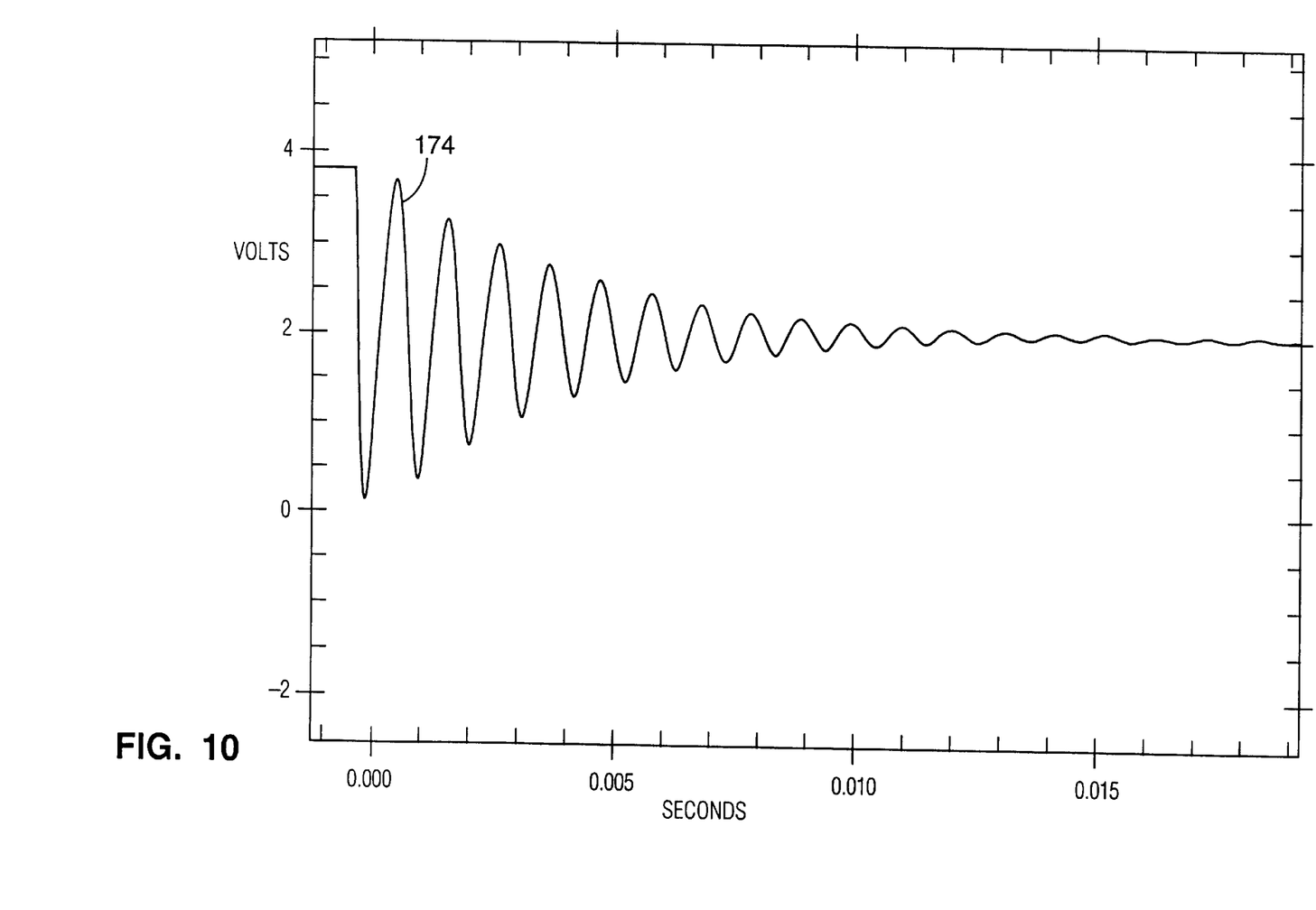
FIG. 10 is a graphical representation of the motion observed for the damping system shown in FIG. 1.

FIG. 10 shows a voltage signal 174 that illustrates the out of plane motion that is observed at the distal end 68 when the system 10 undergoes free vibration. Again, the frequency of the observed cyclic motion corresponds to the first bending mode of the system 10. Based on the signal 174, the calculated critical damping ratio ($C/C_{cr}$) for the system 10 is approximately 0.0411; more than an order of magnitude higher than for the undamped arm. The frequency is approximately 928 Hz. The small frequency drop occurs due to the loss in stiffness of the system 10 caused by the tongues 26, 30 and 34.

Figure 11:
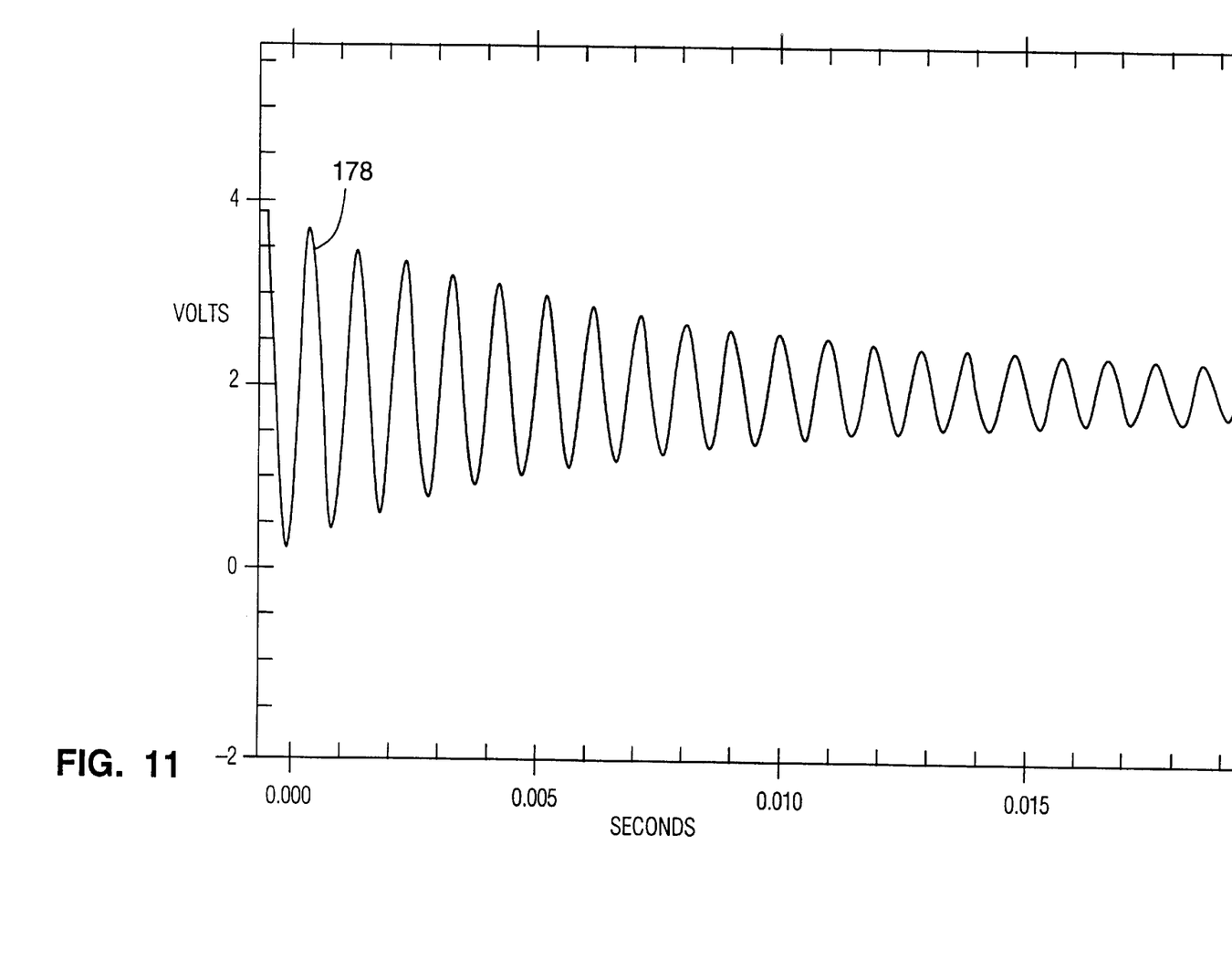
FIG. 11 is a graphical representation of the motion observed for the damping system shown in FIG. 6.

FIG. 11 shows a voltage signal 178 that illustrates the out of plane motion that is observed at the distal end 68 when the system 110 undergoes free vibration. Again, the frequency of the observed cyclic motion corresponds to the first bending mode of the system 110. Based on the signal 178, the calculated critical damping ratio ($C/C_{cr}$) for the system 110 is approximately 0.016. The frequency is approximately 1013 Hz. The frequency drop is less than with the system 10 because there are no tongues cut in the suspensions 111 or 109, resulting in a stiffer system.

Referring now to FIG. 8, the problem addressed by the present invention can be explained. The vibration of the damping systems 10 (or 110) in the disk file 123 produces the undesirable effect of increasing the nonrepeatable run out (NRRO) of the recording element of the sliders 38 and 42. This effect limits the track density and capacity of the disk file 123.

Depending on the configuration of the disk file 123, either the bending or torsional vibration mode will predominate. In systems with linear actuators, the bending modes are the most detrimental while in systems with in-line rotary actuators, the torsional and sway modes produce large off-track slider effects. The modal shapes of vibration uniquely relate the motion of the arm 14 with the motion of the suspensions 18 and 22. Therefore, it is necessary to damp either the arm 14, the suspensions 18 and 22, or both, to reduce the in-plane motion of the sliders 38 and 42.

With respect to the system 10 shown in FIG. 1, the damping elements 36 and 37 function to damp vibrations originating in the arm 14 in the following manner: During operation, the modal vibration of the system 10 causes the arm tongue 26 to undergo sideways (in-plane) motion and up and down motion that is in the opposite direction to the motion of the opposing tongues 30 and 34. The tongue 26 is free to move because of the channel 60 and the tongues 30 and 34 can undergo limited movement because of the channels 86 and 106 and 94 and 108. The relative in-plane motion produces shear in the damping elements 36 and 37. The relative motion in the up and down direction creates volume changes and squeezes the damping elements 36 and 37 at cyclical intervals thereby generating more shear. Both shear and volume changes in the damping elements 36 and 37 damp out vibrations in the system 10.

It should be noted that the shape of the tongues 26, 30 and 34 does not have to be rectangular. In fact, a triangular or tapered tongue could provide higher natural frequencies. However, this would reduce the volume of damping material and the area subject to shear deformation. Furthermore, a tapered shape for the arm tongue 26 would mean that the opposing tongues 30 and 34 are narrower at the bases 90 and 98, respectively. This would strengthen the arm tongue 26 but weaken opposing tongues 30 and 34. Additionally, the location of the bases 64, 90 and 98 can be inverted. For example, the base 64 of arm tongue 26 could be positioned proximally to the member 62.

It should also be noted that the system 10 does not require the opposing tongues 30 and 34 to be functional as is evidenced by the data collected for the system 110.

With respect to the system 110 shown in FIGS. 6 and 7, damping of vibrational modes occurs by energy dissipation through shearing and volumetric pumping of the viscoelastic material. During operation of the system 110, there is more relative out of plane motion, and less relative shear, between the tongues 113 and 114 and the suspensions 111 and 109, because the suspensions 113 and 114 are constrained. Therefore, the damping elements 118 and 120 undergo less shear than with the system 10, but undergo more volume variation. The shorter lengths of the tongues 113 and 114 also result in stiffer tongues which produce more squeezing of the damping elements 118 and 120.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A damping system for use with a data transducer comprising:

an arm adapted for attachment to an actuator, the arm having a thickness "t";

a first arm tongue comprised of a region of the arm that is positioned between at least three channels that extend completely through the arm in the direction of the thickness "t";

a first suspension means for mechanically supporting a first data transducer, the first suspension means being attached to the arm and including a first overlap section which overlaps the arm; and a first damping means positioned between the first arm tongue and the first overlap section for damping vibrations transmitted between the arm and the first suspension means, the first damping means being in contact with the first arm tongue and the first overlap section.

2. The damping system of claim 1 wherein the first damping means comprises a viscoelastic material.

3. The damping system of claim 1 further including:
isolation means for preventing the first damping means from undergoing chemical reactions.

4. The damping system of claim 1 wherein the first suspension means comprises a laminated material having a first layer comprised of a metal, a second layer comprised of a dielectric material and a third layer comprised of an electrical conductor.

5. The damping system of claim 4 wherein the first suspension means is bonded to the arm along a surface of the first layer.

6. The damping system of claim 4 wherein the first layer comprises stainless steel, the second layer comprises a polyimide, and the third layer comprises a high strength copper alloy.

7. The damping system of claim 1 further comprising:
a second suspension means attached to the arm for holding a second data transducer; and
a second damping means positioned between the arm tongue and the second suspension means for damping vibrations transmitted between the arm and the second suspension means.

8. The damping system of claim 1 further comprising:
a second arm tongue comprised of a region of the arm that can move relative to the arm.

9. A damping system for use with a data transducer comprising:
an arm for attachment to an actuator, the arm having a first surface and a second surface and a thickness "t" separating the first surface from the second surface;
an arm tongue comprised of a region of the arm that is separated from the arm on three sides by a channel which extends completely through the thickness "t" of the arm;
a first cavity comprised of a region of the arm tongue that is recessed from the first surface of the arm by a depth "D";
a first suspension means attached to the arm for providing mechanical support to a first data transducer and having a thickness "p";
a first opposing tongue section comprised of a region of the first suspension means that is separated from the first suspension means on three sides by a channel which extends at least part of the way through the thickness "p" of the first suspension member, the first opposing tongue section overlapping at least a portion of the first cavity; and
a first damping means positioned in the first cavity between the arm tongue and the first opposing tongue for damping vibrations transmitted between the arm and the first suspension means.

10. The damping system of claim 9 wherein the first damping means comprises a viscoelastic material.

11. The damping system of claim 9 further including:
isolation means for preventing the first damping means from undergoing chemical reactions.

12. The damping system of claim 9 wherein the first opposing tongue is rectangular in shape and includes a first opposing tongue base and the arm tongue is rectangular in shape and includes a base positioned at an opposite end of the arm relative to the first opposing tongue base.

13. The damping system of claim 9 wherein the first suspension means comprises a laminated material having a first layer comprised of a metal, a second layer comprised of a dielectric material and a third layer comprised of an electrical conductor.

14. The damping system of claim 13 wherein the first suspension means is bonded to the arm along a surface of the first layer.

15. The damping system of claim 13 wherein the first layer comprises stainless steel, the second layer comprises a polyimide, and the third layer comprises a high strength copper alloy.

16. The damping system of claim 9 further comprising:
a second cavity comprised of a region of the arm tongue that is recessed from the second surface of the arm by a depth "E";
a second suspension means attached to the arm for providing mechanical support to a second data transducer and having a thickness "p";
a second opposing tongue section comprised of a region of the second suspension means that is separated from the second suspension means on three sides by a channel which extends at least part of the way through the thickness "p" of the second suspension means, the second opposing tongue section overlapping at least a portion of the second cavity; and
a second damping means positioned in the second cavity between the arm tongue and the second opposing tongue for damping vibrations transmitted between the arm and the second suspension means.

17. A damping system for use with a data transducer comprising:
a first transducer means for reading and/or writing data on a magnetic medium;
a first slider means for holding the first transducer means;
an arm for attachment to an actuator, the arm having a first surface and a second surface and a thickness "t" separating the first surface from the second surface;
a first arm tongue comprised of a region of the arm that is positioned between at least three channels that extend completely through the thickness "t" of the arm, the first arm tongue having a plurality of sides which define the edges of the first arm tongue, the first arm tongue being surrounded by the arm on at least three of the sides;
a first suspension means attached to the arm for holding the first slider means, the first suspension means being positioned between the arm and the first slider means and including a first overlap section which overlaps the arm; and
a first damping means positioned between the first arm tongue and the first overlap section for damping vibrations transmitted between the arm and the first suspension means, the first damping means being in contact with the first arm tongue and the first overlap section.

18. The damping system of claim 17 wherein the first damping means comprises a viscoelastic material.

19. The damping system of claim 17 further including:
isolation means for preventing the first damping means from undergoing chemical reactions.

20. The damping system of claim 17 wherein the first suspension means comprises a laminated material having a first layer comprised of a metal, a second layer comprised of a dielectric material and a third layer comprised of an electrical conductor.

21. The damping system of claim 20 wherein the first suspension means is bonded to the arm along a surface of the first layer.

22. The damping system of claim 20 wherein the first layer comprises stainless steel, the second layer comprises a polyimide, and the third layer comprises a high strength copper alloy.

23. The damping system of claim 17 further comprising:
   a second transducer means for reading and/or writing data on a magnetic medium;
   a second slider means for holding the second transducer means;
   a second suspension means attached to the arm for holding the second slider means; and
   a second damping means positioned between the arm tongue and the second suspension means for damping vibrations transmitted between the arm and the second suspension means.

24. The damping system of claim 17 further comprising:
   a second arm tongue comprised of a region of the arm that can move relative to the arm.

25. A damping system for use with a data transducer comprising:
   a first data storage medium;
   a first transducer means for reading and/or writing data on the first data storage medium;
   a first slider means for holding the first transducer means;
   an actuator means for moving the first transducer means relative to the first data storage medium;
   an arm attached to the actuator means, the arm having a first surface and a second surface and a thickness "t" separating the first surface from the second surface;
   a first arm tongue comprised of a region of the arm that is positioned between at least three channels that extend completely through the thickness "t" of the arm, the first arm tongue having a plurality of sides which define the edges of the first arm tongue, the first arm tongue being surrounded by the arm on at least three of the sides;
   a first suspension means attached to the arm for holding the first slider means, the first suspension means being positioned between the arm and the first slider means and including a first overlap section which overlaps the arm; and
   a first damping means positioned between the first arm tongue and the first overlap section for damping vibrations transmitted between the arm and the first suspension means, the first damping means being in contact with the first arm tongue and the first overlap section.

26. The damping system of claim 25 wherein the first damping means comprises a viscoelastic material.

27. The damping system of claim 25 further including:
   isolation means for preventing the first damping means from undergoing chemical reactions.

28. The damping system of claim 25 wherein the first suspension means comprises a laminated material having a first layer comprised of a metal, a second layer comprised of a dielectric material and a third layer comprised of an electrical conductor.

29. The damping system of claim 28 wherein the first suspension means is bonded to the arm along a surface of the first layer.

30. The damping system of claim 29 wherein the first layer comprises stainless steel, the second layer comprises a polyimide, and the third layer comprises a high strength copper alloy.

31. The damping system of claim 25 further comprising:
   a second data storage medium;
   a second transducer means for reading and/or writing data on the second data storage medium;
   a second slider means for holding the second transducer means;
   a second suspension means attached to the arm for holding the second slider means;
   a second damping means positioned between the arm tongue and the second suspension means for damping vibrations transmitted between the arm and the second suspension means.

32. The damping system of claim 25 further comprising:
   a second arm tongue comprised of a region of the arm that can move relative to the arm.

33. A damping system for use with a data transducer comprising:
   a slider for holding a data transducer;
   an arm for attachment to an actuator, the arm having a first surface and a second surface and a thickness "t" separating the first surface from the second surface;
   an arm tongue comprised of a region of the arm that is positioned between at least three channels that extend completely through the thickness "t" of the arm, the arm tongue having a plurality of sides which define the edges of the arm tongue, the arm tongue being surrounded by the arm on at least three of the sides;
   a suspension means attached to the arm for holding the slider, the suspension means being positioned between the arm and the slider and including an overlap section which overlaps the arm, the suspension means comprising a laminated material comprised of a rigid layer, a dielectric layer and an electrically conducting layer; and
   a damping member positioned between the arm tongue and the overlap section, the damping member being in contact with the arm tongue and the overlap section.

34. The damping system of claim 33 wherein the rigid layer comprises stainless steel, the dielectric layer comprises a polyimide and the conductor layer comprises a high strength copper alloy.

* * * * *